(12) United States Patent
Greimel-Längauer et al.

(10) Patent No.: US 11,114,025 B2
(45) Date of Patent: Sep. 7, 2021

(54) METHOD FOR SENSING LIGHT

(71) Applicant: ams AG, Premstaetten (AT)

(72) Inventors: Bernhard Greimel-Längauer, AE Eindhoven (NL); Joachim Lechner, AE Eindhoven (NL); Josef Kriebernegg, AE Eindhoven (NL)

(73) Assignee: AMS AG, Premstaetten (AT)

( * ) Notice: Subject to any disclaimer, the term of this patent is extended or adjusted under 35 U.S.C. 154(b) by 0 days.

(21) Appl. No.: 16/964,792

(22) PCT Filed: Jan. 31, 2019

(86) PCT No.: PCT/EP2019/052360
§ 371 (c)(1),
(2) Date: Jul. 24, 2020

(87) PCT Pub. No.: WO2019/149811
PCT Pub. Date: Aug. 8, 2019

(65) Prior Publication Data
US 2021/0056896 A1 Feb. 25, 2021

(30) Foreign Application Priority Data

Jan. 31, 2018 (EP) .................................... 18154506
May 15, 2018 (EP) .................................... 18172446

(51) Int. Cl.
*G09G 3/3208* (2016.01)
*G01J 1/42* (2006.01)
*H04M 1/02* (2006.01)

(52) U.S. Cl.
CPC .......... *G09G 3/3208* (2013.01); *G01J 1/4204* (2013.01); *H04M 1/0266* (2013.01);
(Continued)

(58) Field of Classification Search
CPC ... G01J 1/4204; G09G 3/3208; G09G 3/3406; G09G 5/10; G09G 2310/0237;
(Continued)

(56) References Cited

U.S. PATENT DOCUMENTS 9,557,214 B2 * 1/2017 Ho ............................ G01J 1/32
10,952,297 B2 * 3/2021 Eisele .................... H05B 45/20
2008/0284716 A1 11/2008 Edwards et al.

OTHER PUBLICATIONS

European Patent Office, International Search Report for PCT/EP2018/052360 dated Feb. 22, 2019.

* cited by examiner

*Primary Examiner* — Nelson M Rosario
(74) *Attorney, Agent, or Firm* — MH2 Technology Law Group LLP

(57) ABSTRACT

A method is proposed for sensing light being incident on an electronic device. The electronic device comprises a display and a light sensor arrangement which is mounted behind the display such as to receive incident light through the display. The method comprises the step of repeatedly switching the display on and off depending on a modulation signal, wherein a sub-frame is defined by an on-state and a consecutive off-state of the display. The modulation signal depends on at least one modulation parameter. In a first sub-frame a display brightness is set to a first level depending on a first value of the at least one modulation parameter. Then a first frame count is determined by integrating the incident light by means of the light sensor arrangement during the first sub-frame. In a second sub-frame the display brightness is set to a second level depending on a second value of the at least one modulation parameter. Then a second frame count is generated by integrating the incident light by means of the light sensor arrangement during the second frame. Finally, an ambient light level is determined
(Continued)

depending on the first frame count and the second frame count.

18 Claims, 3 Drawing Sheets

(52) U.S. Cl.
CPC . *G09G 2310/0237* (2013.01); *G09G 2310/06* (2013.01); *G09G 2320/064* (2013.01); *G09G 2320/0633* (2013.01); *G09G 2320/0666* (2013.01); *G09G 2360/144* (2013.01); *G09G 2360/145* (2013.01); *H04M 2250/12* (2013.01)

(58) Field of Classification Search
CPC .......... G09G 2310/06; G09G 2310/08; G09G 2320/0247; G09G 2320/0633; G09G 2320/064; G09G 2320/0666; G09G 2360/144; G09G 2360/145; G09G 2320/043; G09G 2320/0626; G09G 2320/0693; H04M 1/0266; H04M 2250/12

See application file for complete search history.

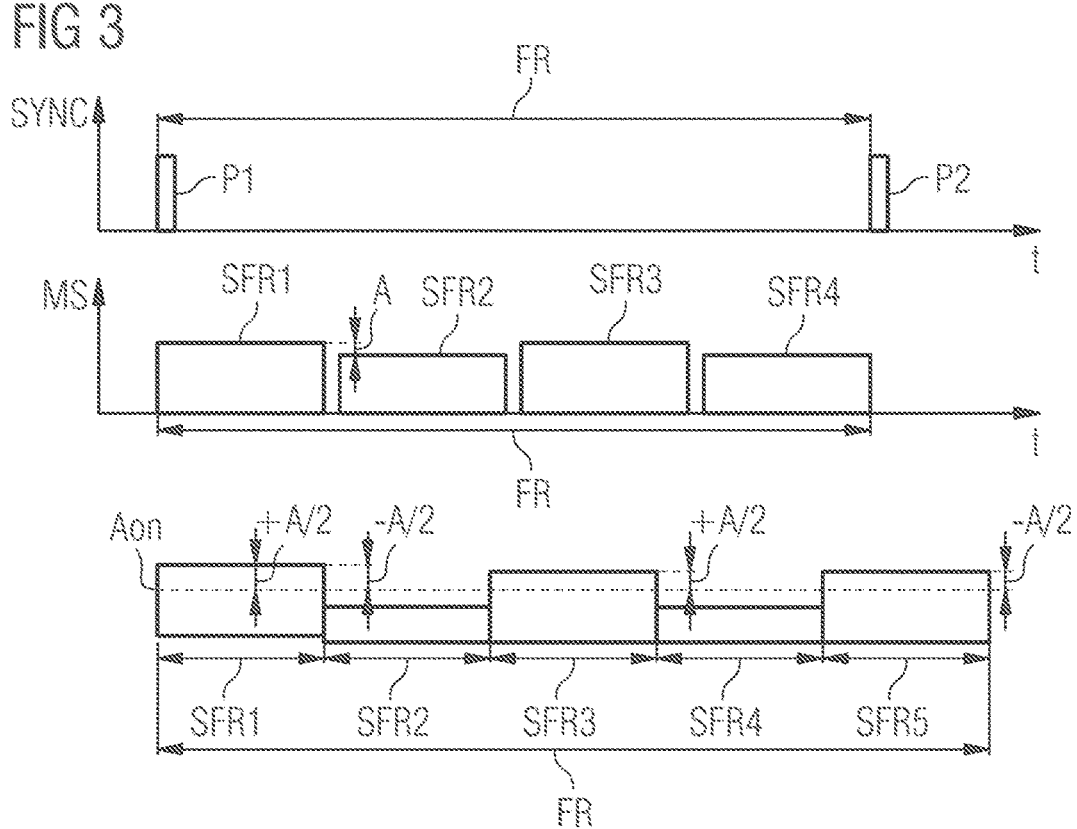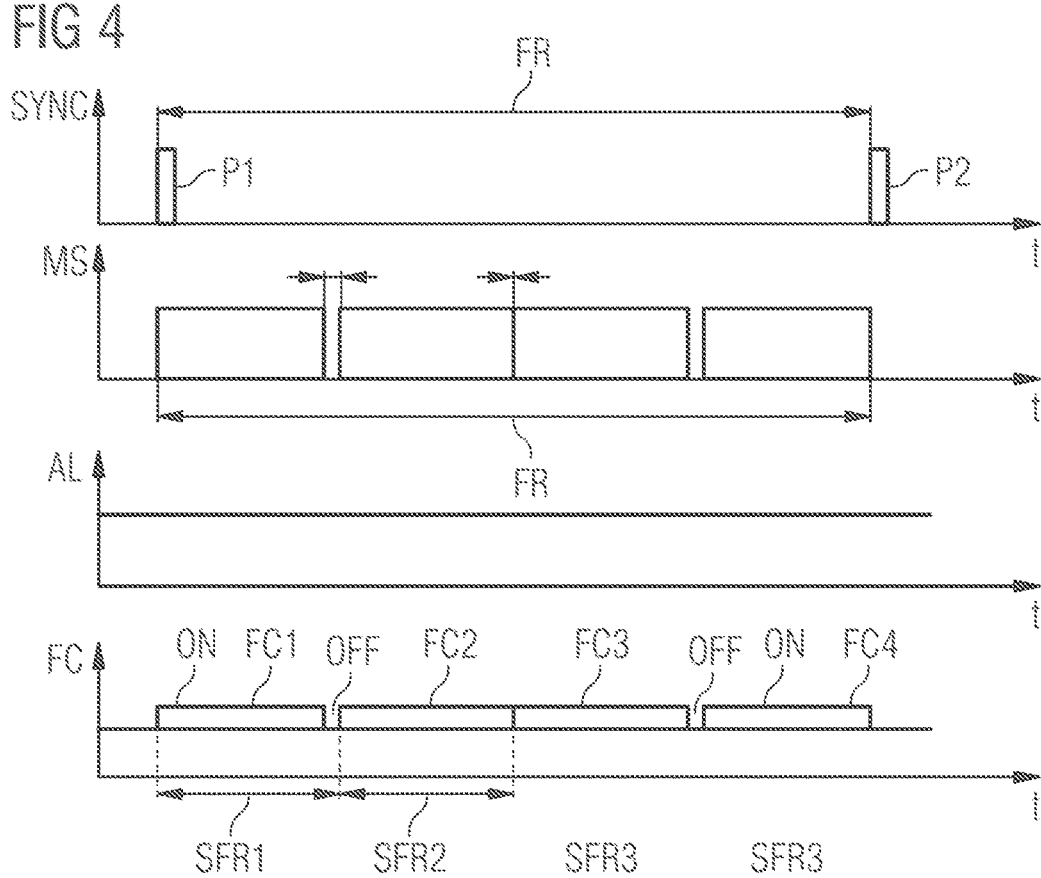

METHOD FOR SENSING LIGHT

CROSS-REFERENCE TO RELATED APPLICATIONS

The present application is the national stage entry of International Patent Application No. PCT/EP2019/052360, filed on Jan. 31, 2019, which claims the benefit of priority of European Patent Application No. 18154506.2, filed on Jan. 31, 2018, all of which are hereby incorporated by reference in their entirety for all purposes.

The disclosure relates to a method for light sensing, for example, for light sensing of ambient light incident on a display.

BACKGROUND OF THE DISCLOSURE

Light sensors, such as ambient light sensors (ALS) or color sensors, are widely used in mobile devices such as mobile phones, smartphones, computers and tablets. ALS and color sensors provide information about level and color of ambient light, respectively, which can be used to support display control, such as a backlight LED power circuit or OLED drivers. For example, the backlight of a LCD panel in a smartphone accounts for around 40% of the device's total power consumption. Thus, there is a great benefit to be gained from adjusting display brightness in response to changes in ambient light levels. In a relatively dark environment, the brightness of the display can be reduced to save power. This is also easier on the user's eyes, and improves the user experience at the same time.

Prior art solutions often attempt to turn off the display completely or at least for a short period of time. Turning the display off or altering display control signals is one possible way to measure an amount of ambient light under dark conditions. However, measuring ambient light during display off times and just for short integration times might lead to significant errors, e.g. in a case where the ambient light is modulated. Typical examples relate to light sources that are operated with 50 to 60 Hz AC.

There is an increasing demand for full format smartphone displays. As a consequence smartphone bezels keep getting narrower, and often there is not enough space to place a light sensor to measure illuminance and correlated color temperature, CCT, of the environment under the touch panel. Instead customers demand that the light sensor is located directly under the display panel in order to measure illuminance and CCT of the environment. One of the challenges of measuring ambient light is to remove stray light generated by the display. Furthermore, the light sensor often has additional functionality such as proximity detection as thus should be placed close to the display in order to function correctly. These and other constraints limit the freedom for the design engineer to optimize the design of the light sensor.

It is to be understood that any feature described hereinafter in relation to any one embodiment may be used alone, or in combination with other features described hereinafter, and may also be used in combination with one or more features of any other of the embodiments, or any combination of any other of the embodiments, unless explicitly described as an alternative. Furthermore, equivalents and modifications not described below may also be employed without departing from the scope of the method for sensing light as defined in the accompanying claims.

SUMMARY OF THE DISCLOSURE

The following relates to an improved concept in the field of light sensing, such as light sensing behind a display. The improved concept employs ways to cancel out ambient light affecting a display by modulating the brightness of display sub-frames and then cancel out the ambient light by a mathematical operation. For example, consecutive sub-frames are modulated using different modulation parameters of a modulation function, e.g. by means of pulse width modulation, PWM. In some embodiments amplitude and/or duty cycle modulation of sub-frames are employed. Light sensing during different sub-frames is executed and combined with known parameters in order to derive an ambient light level.

In at least one embodiment a method for sensing light employs an electronic device. The electronic device comprises a display and a light sensor arrangement mounted behind the display. Light being incident on the display may traverse through the display and can be received and eventually detected by means of the light sensor arrangement.

The term "behind" denotes that the light sensor arrangement is placed on or into a body of the electronic device and is covered by the display. In this configuration, light which is incident on the electronic device traverses through the display and eventually reaches the light sensor arrangement. Light may be detected by the light sensor arrangement and typically comprises contributions from at least two sources. First, ambient light from the devices environment, e.g. sun light, room lighting, light emitted by other devices etc., may strike the display and be incident on the light sensor arrangement. Second, the display emits light, e.g. by means of active pixels or by backlighting etc., which may be guided or reflected back towards the light sensor arrangement.

Different types of displays may be used with the proposed method such as a flat-panel display including liquid crystal displays, LCDs, liquid crystal displays with light-emitting diode, LED, backlighting, plasma panels, electroluminescent panels or displays based on organic light-emitting diodes, OLEDs. The light sensor arrangement can be implemented by various types of light sensors including ambient light sensors and/or color sensors. The term "arrangement" indicates an integrated circuit which may have various on-chip components for signal acquisition or (pre-) processing. The light sensor arrangement may have a single or a number of light sensors, such as photodiodes, which are packaged into a common integrated circuit or spread over different locations of the electronic device. Typically, the common integrated circuit or various integrated circuits are combined into the same sensor module or package. The electronic device may be any device with a display, such as a mobile device, mobile phone, smartphone, computers, tablets, for example.

The method for sensing light being incident on the electronic device comprises the following steps.

During execution of the method for light sensing the display is repeatedly switched on and off depending on a modulation signal. A sub-frame is defined by an on state and the consecutive off state of the display. The modulation signal depends on at least one modulation parameter.

In a first sub-frame a display brightness is set to a first level depending on the first value of the at least one modulation parameter. A first frame count is determined by integrating the incident light by means of the light sensor arrangement during the first sub-frame. In a second sub-frame the display brightness is set to a second level depending on a second value of the at least one modulation parameter. A second frame count is generated by integrating the incident light by means of the light sensor arrangement during the second frame. Finally, an ambient light level is determined depending on the first frame count and the second frame count.

The term "switching the display on and off" may have different meanings depending on the type of display. For example, in active displays the term indicates that some or all pixels may be activated or deactivated, thereby emitting light or not emitting light, respectively. In passive displays the term indicates activation or deactivation of display backlight, for example. Furthermore, a combination of active display and display backlight is also envisaged. In conclusion, the term "switching the display on and off" indicates that when the display is switched on it emits light to a certain amount. When switched off the display emits less light or even no light at all. The modulation signal controls the switching of the display, e.g. by means of a display driver or backlight control. The modulation parameter may have different values that alter the properties of the modulation signal. This will be considered a "modulation" hereinafter and will be discussed in more detail below.

The proposed method for light sensing allows for an improved detection of light sources such as ambient light, for example, behind displays, and thereby facilitates reliable display control. In fact, the method may be applied to various applications where light is measured behind displays. Modulated sub-frames are used to set different display levels. An impact of the display light on the sensor signal behind display can be detected and a contribution of ambient light to said sensor signal can be deduced. Information of display and ambient light information in a display frame can be separated and further processed and used for display control such as brightness adjustments, camera information, etc.

Since the modulation is done on the sub-frames, it may not be visible for the human eyes. In addition the integration time for a single sub-frame measurement can be much longer compared to prior art solutions and may therefore provide much higher integration counts and allow an easier hardware implementation. In conclusion, ambient light measurement behind display with modulated brightness of sub-frames allows for longer integration times and simpler chip integration.

In at least one embodiment a first integration time corresponds to a duration of the first sub-frame. The first frame count is indicative of the incident light being integrated during the first integration time or, in other words, is indicative of the incident light being integrated during the first sub-frame. Similarly, a second integration time corresponds to a duration of the second sub-frame such that the second frame count is indicative of the incident light integrated during the second integration time.

In general, the proposed method allows for longer integration times as discussed above. The integration may be as long as the duration of the sub-frames, thereby offering a convenient time frame to achieve a reliable signal-to-noise ratio.

In at least one embodiment the first integration time corresponds to a fraction of the duration of the first sub-frames. In other words, the light sensor arrangement does not integrate for the complete duration of a sub-frame but only for a fraction of that duration. Similarly, the second integration time may also correspond to a fraction of the duration of the second sub-frame.

In some applications it may suffice to employ integration times that are shorter than a complete duration of sub-frames. For example, the integration time may be centered at a transition between an on state and consecutive off state of the display, e.g. a corresponding transition between high and low levels in the modulation signal. Thus, shorter integration times may reveal the same information content, e.g. by scaling the respective frame counts integrated during the shorter integration times.

In at least one embodiment the first and the second integration times are the same in value. Typically, the duration of sub-frames may be the same during a frame of the display.

In at least one embodiment a synchronization signal is provided and comprises synchronizing pulses. Two consecutive synchronizing pulses define a frame of the display. A frame comprises at least the first sub-frame and the second sub-frame. Finally, a succession of sub-frames is synchronized with the synchronization signal.

A frame (or image to be displayed) has a certain duration which is longer than that of its sub-frames. For example, a frame has a duration in the range of 1 ms, 10 ms, 50 ms, 100 ms, 200 ms, or more. The display is typically updated between successive frames. Integration of light during the sub-frames, e.g. PWM off times due to display or frame updates, may be centered away from a start or end of an individual frame, e.g. as defined by synchronizing pulses. This may help to reduce fading effects from bright to dark and vice versa.

In at least one embodiment the modulation signal comprises a succession of pulses with consecutive high and low levels.

The sub-frames are synchronized to the pulses of the modulation signal and/or the synchronization signal.

In at least one embodiment the modulation signal is a pulse width modulation, PWM, signal.

In at least one embodiment the pulses of the modulation signal each have an amplitude. The amplitudes are set by means of an amplitude parameter as modulation parameter.

In at least one embodiment a supply current of the display and/or individual pixels of the display is set by means of the amplitude parameter.

In at least one embodiment the pulses of the modulation signal or modulated so that each have a duty cycle. Each duty cycle is set by means of a duty cycle parameter as modulation parameter.

In at least one embodiment the pulses of the modulation signal are modulated by means of a timing parameter as modulation parameter. A duration of sub-frames are altered as a function of the modulation parameter.

In at least one embodiment the light sensor arrangement comprises a light sensor, such as a photodiode or an array of photodiodes. The ambient light level can be used to adjust the display brightness.

In at least one embodiment the light sensor arrangement comprises a color light sensor. The ambient light level can be used to adjust a display color, for example, a color temperature value of the display. For example, the color light sensor can be used to adjust both display brightness and display color.

In at least one embodiment two consecutive sub-frames are used as first and second sub-frames to determine the ambient light level, respectively. Alternatively, a number of first sub-frames and a number of second sub-frames are combined to determine the ambient light level. For example, the number of first and second sub-frames can be accumulated within a certain time period. The sub-frames may be from the same frame (FR) or from different frames. For example, the number of first sub-frames and number of second sub-frames may be processed in pairs to derive respective values for the ambient light level which may then be added up to result in a sum of the results of the sub-frames. Using multiple sub-frames may average out time variant contributions to the ambient light such as an AC component.

In at least one embodiment the display brightness at the first and/or second level is set for a region of interest. The light sensor arrangement integrates the incident light locally from the region of interest. For example, any sub-frame of the display may be used as first or second sub-frame to determine the ambient light level. The region of interest can be arranged to have a predetermined or known brightness and the light sensor arrangement determines the corresponding frames counts. This way only a small part of the display may be used to determine the ambient light level. The small part may not be apparent for an end user such that the proposed method may not interfere with the end user experience.

Alternatively, the display brightness at the first and/or second level is set for the whole display. The light sensor arrangement integrates the incident light globally for the whole display, e.g. for first/second sub-frames. Furthermore, the first/second sub-frames can be recorded at brightness levels that appear the same to the end user or at differences in level that do not interfere with the end user experience.

In the following, the principle presented above is described in further detail with respect to drawings, in which exemplary embodiments are presented.

In the examples of embodiments and Figures below, similar or identical elements may each be provided with the same reference numerals. The elements illustrated in the drawings and their size relationships among one another, however, should not be regarded as true to scale. Rather individual elements, such as layers, components, and regions, may be exaggerated to enable better illustration or improved understanding.

BRIEF DESCRIPTION OF THE DRAWINGS

FIG. 3 shows another example of a modulation function for light sensing,

FIG. 4 shows an embodiment of a method for light sensing,

DETAILED DESCRIPTION

Figure 1:
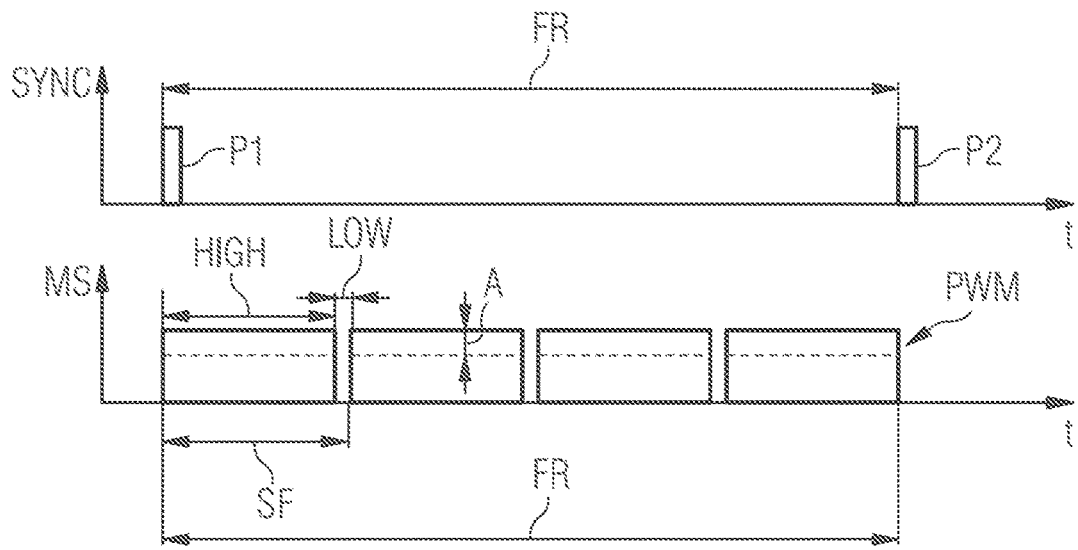
FIG. 1 shows an example of a modulation function for light sensing.

FIG. 1 shows an embodiment of an example of a modulation function for light sensing. The upper graph shows a synchronization signal SYNC as a function of time t, whereas the lower graph shows a modulation signal MS as a function of time t.

The synchronization signal SYNC comprises synchronizing pulses P1, P2 which can be added to a video signal at the end of every scan line and video frame ensure that an image can be reconstructed on the display. Between two consecutive synchronizing pulses the display shows an image or frame FR. A refresh rate defines a frequency or rate at which consecutive images, i.e. frames, appear on the display. The refresh rate for modern displays lies in the range of 50 to 60 Hz, for example. The refresh rate translates into a period or duration of a frame. In case of a refresh rate of 60 Hz the duration of a frame equals 16.66 ms, for example. The refresh rate may include the repeated drawing of identical frames to a display. The synchronization signal SYNC may implement a vertical synchronization, VSYNC, or a horizontal synchronization, HSYNC, of the display, for example. The synchronization signal SYNC and synchronizing pulses P1, P2 are typically provided by a display driver.

The modulation signal shown in the lower graph comprises several sub-frames. The modulation signal may be pulsed in the sense that it comprises consecutive high and low levels.

A sub-frame is defined by a succession of a high and low level HIGH, LOW of the modulation signal. In this embodiment modulation signal is synchronized with the synchronization signal SYNC. For example, a first sub-frame is synchronized with a first synchronizing pulse P1 and a last sub-frame is synchronized with a second synchronizing pulse P2. The modulation signal is a pulse width modulation, PWM, signal, for example. The modulation signal may be provided by a power circuit of the electronic device, such as a backlight LED power circuit of a display driver, or by means of the display driver of an organic light emitting diode, OLED, display. In turn, the display is turned on or off depending on whether the modulation signal is at a high or at a low level.

There are several basic modulation concepts used in displays in order to control a display brightness. The term "display brightness" relates to the amount of light that is emitted by the display or a display area into a certain direction. The term "luminance" is a photometric measure of the luminous intensity per unit area of light travelling in a given direction and, thus, is related to brightness. It describes an amount of light that is emitted or reflected from a particular area, and falls within a given solid angle. Luminance and brightness are parameters that can be controlled within a certain extent by means of the modulation signal MS. The modulation signal not only is a function of time t but can be parametrized using modulation parameters. The lower graph shows two basic modulation concepts which use corresponding modulation parameters to alter amplitude A (e.g. supply current) and/or a duty cycle of the display. If a modulation is executed faster than 50 Hz, the modulation cannot be recognized by the human eye. The two different concepts will be discussed in further detail in FIGS. 2 and 3.

Figure 2:
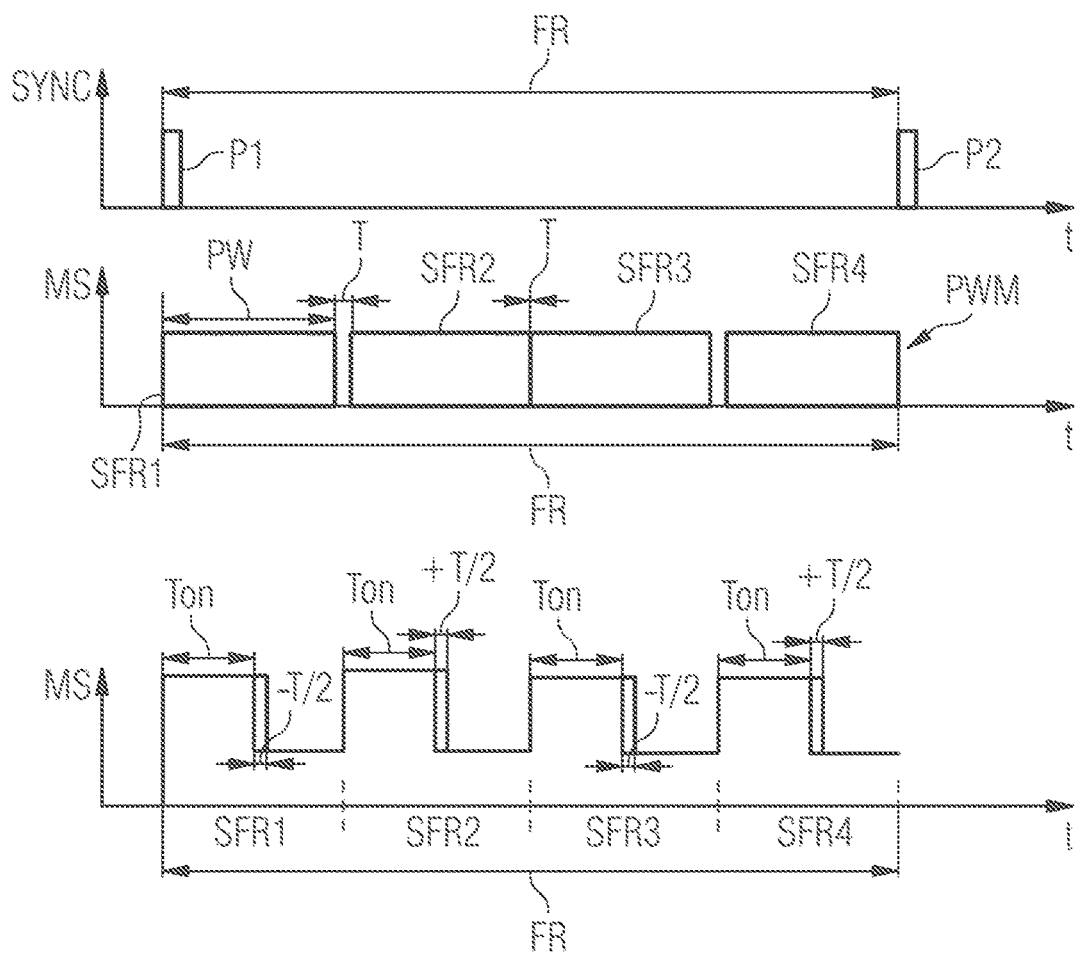
FIG. 2 shows another example of a modulation function for light sensing.

FIG. 2 shows an embodiment of an example of a modulation function for light sensing. The upper graph is the same as in FIG. 1. The middle and lower graphs, however, show an example of a delta modulation of the modulation signal. In this example, the modulation signal is a PWM signal and the modulation parameter is a duty cycle of the display. The duty cycle can be considered a fraction of one sub-frame in which the modulation signal is at high level. The duty cycle is commonly expressed as a percentage or a ratio. A period is the time it takes for a signal to complete a sub-frame, i.e. a corresponding high and low level. The duty cycle may be expressed as $$D = \frac{PW}{T_o},$$

where D is the duty cycle, PW is a pulse width or active pulse time of a given sub-frame, and $T_0$ is a total period of said sub-frame.

The drawing shows an example frame having four sub-frames. The first sub-frame SFR1 has a duty cycle of 90%. The duty cycle of a second sub-frame SFR2 is then changed to 100% and returns to 90% with third and fourth sub-frames SFR3, SFR4, for example. The change in duty cycle alters the display brightness and, thus, can be detected by means of a light sensor. This will be explained in more detail in FIG. 4.

The drawing shows another example frame with four sub-frames SFR1 to SFR4. Consider Ton to represent a mean active pulse time of sub-frames during a frame FR. A display brightness BR during frame FR can be defined as BR=Ton/FR. Furthermore, let T indicate a time during which the display is turned off (which may vary from sub-frame to subframe). In this example, the first sub-frame SFR1 has a pulse width or active pulse time of Ton−T/2, the second sub-frame SFR2 has a pulse width of Ton+T/2, the third sub-frame SFR3 has a pulse width of Ton−T/2, and the fourth sub-frame SFR4 has a pulse width of Ton+T/2. The display off time T of a sub-frame can be considered a modulation index or modulation parameter of the modulation signal MS. Over one frame rate FR the display brightness may have the same level as the modulation of off times cancels out: $2 \cdot (+T/2) + 2 \cdot (-T/2) = 0$.

FIG. 3 shows an embodiment of an example of a modulation function for light sensing. The upper graph is the same as in FIG. 1. The middle graph, however, shows an example of an amplitude modulation. In this example, the modulation signal MS is a PWM signal and the modulation parameter is a supply current of the display. The drawing again shows an example frame having four sub-frames. The first sub-frame SFR1 has a first amplitude which is defined by a first current. The second sub-frame SFR2 has a second amplitude which is defined by a second current. This in example, the second amplitude is lower in value than the first amplitude. The amplitude returns in value to the first amplitude with the third and fourth sub-frame SFR3, SFR4, for example. The change in amplitude alters the display brightness as well and, thus, can be detected by means of the light sensor arrangement. This will be explained in more detail in FIG. 4.

The lower graph shows another example frame with four sub-frames SFR1 to SFR4. Consider amplitude Aon to represent a mean amplitude of successive sub-frames SFR1 to SFR4 during a frame FR. Amplitude Aon corresponds to mean supply current of the display. Furthermore, let A indicate an amplitude modulation which may vary from sub-frame to subframe. In this example, the first sub-frame SFR1 has an amplitude of Aon+A/2, the second sub-frame SFR2 has an amplitude of Aon−A/2, the third sub-frame SFR3 has an amplitude of Aon+A/2, and the fourth sub-frame SFR4 has an amplitude of Aon+A/2. The amplitude modulation A of a sub-frame can be considered a modulation index or modulation parameter of the modulation signal MS. Over one frame rate FR the display brightness may have the same level as the modulation occurs around the mean amplitude or the mean supply current of the display.

In another embodiment (not shown) the succession of sub-frames in time are modulated. A duration or pulse width of high levels or low levels can be altered as modulation parameter. Such changes alter the display brightness as well and, thus, can be detected by means of a light sensor. In general, any combination of modulation concepts discussed above can be present in an embodiment of a modulation function for light sensing.

FIG. 4 shows an embodiment of a method for light sensing. The two upper graphs are identical to those depicted in FIG. 2. Furthermore, the drawing shows another graph which depicts an ambient light level AL as a function of time.

The method for light sensing can be implemented in hard—and/or software of an electronic device 1. The electronic device 1 comprises a display 11 such as a flat-panel display including liquid crystal displays (LCDs), liquid crystal displays with light-emitting diode (LED) backlighting, plasma panels, electroluminescent panels or displays based on organic light-emitting diodes (OLEDs). The display may be used together with a backlight or may emit light on its own. Furthermore, a light sensor arrangement 12 is mounted behind the display 11. The light sensor arrangement is positioned such as it eventually receives incident light through the display.

The display 11 is repeatedly switched on and off depending on a modulation signal MS, e.g. every high level of the modulation signal causes the display to switch on and every low level of the modulation signal causes the display to switch off. The switching states define the sub-frames discussed above. In fact, a sub-frame SFR is defined by an on-state ON and a consecutive off-state OFF of the display 11. The term "display" comprises both active and passive display, i.e. those that emit by themselves and those that employ additional means such as backlighting. Thus, the terms "display switched on" and "display switched off" correspond to the display not actively emitting light or the additional means such as backlighting not irradiating the passive display. Typically, repeatedly switching the display on and off occurs within the reference framework of a frame or image to be displayed. A frame is synchronized with the synchronization signal SYNC, i.e. synchronizing pulses P1, P2. Thus, switching of the display and the modulation signal are also typically synchronized with the synchronization signal SYNC.

As the display switching depends on the modulation signal MS it can be modulated according to one or more of the concepts discussed above with respect to FIGS. 1 to 3. Corresponding modulation parameter MP can be set to alter the modulation signal. Basically, the modulation defined by the modulation parameter MP modulates the modulation signal MS and thereby sets a display brightness to a known level.

In the following two consecutive sub-frames SFR1, SFR2 are considered. The ambient light is assumed to be constant during a frame, e.g. a DC light source. The modulation signal is represented as a PWM signal having a duty cycle D and amplitude A. The amplitude can be modulated by adjusting a supply current of the display, e.g. for LED or OLED display pixels. An amplitude parameter AP defines the applied current and may hold values from 0 . . . 1 or 0% to 100%. The amplitude parameter AP characterizes brightness levels of the display, e.g. 0 or 0% indicating that the display is switched off completely, and 1 or 100% indicating that the display is switched on to a maximum brightness or defined brightness DL.

A duty cycle parameter DP depends on the duty cycle set for the corresponding sub-frame. The duty cycle parameter DP is defined as 1−D, wherein D is the duty cycle. In the example discussed in FIG. 2 the duty cycle us set to 90% and the corresponding duty cycle parameter DP is 0.1. The display brightness can be modulated using the amplitude parameter AP and/or duty cycle parameter DP. As a more general term the following discussion considers a modulation index MI as modulation parameter. The modulation index MI characterizes brightness levels of the display, e.g.

0 or 0% indicating that the display brightness is not modulated, and 1 or 100% indicating that the display brightness is modulated at 100%.

In a first sub-frame SFR1 the display brightness is set to a first level DL1. The first level DL1 is defined by a first modulation index MI1 depending on a first amplitude parameter AP1 and/or a first duty cycle parameter DP1. In a second sub-frame SFR2 the display brightness is set to a second level DL2. The second level DL2 is defined by a second modulation index MI2 depending on a second amplitude parameter AP2 and/or a second duty cycle parameter DP2. Both the first sub-frame SFR1 and the second sub-frame SFR2 are assumed to show contributions of ambient light and, thus, depend on an ambient light level AL which is assumed to be constant for the whole frame.

The graph at the bottom shows a frame count FC generated by the light sensor arrangement as a function of time t. During the first sub-frame SFR1 the light sensor arrangement 12 integrates incident light. As the light sensor arrangement is positioned behind the display it collects light both from the display and ambient light sources. As a result the light sensor arrangement generates a first frame count FC1. During the second sub-frame SFR2 the light sensor arrangement 12 integrates incident light again and generates a second frame count FC2. The first and second frame counts are indicative of the incident light during the first and second sub-frames, respectively. The light sensor arrangement integrates light during an integration time. The integration time may be synchronized with respect to the corresponding sub-frame or synchronization signal SYNC in general. Furthermore, the light sensor arrangement may integrate light during the whole sub-frame or only a defined part of the sub-frame. The integration, e.g. setting and synchronizing integration time, may be controlled by means of a control unit of the light sensor arrangement.

In general, the first and second frame counts FC1, FC2 can be expressed as follows:

$FC1=AL+DL1$ $FC2=AL+DL2.$

The display levels DL1, DL2 are defined by parameters known by design and configuration of the display (see discussion above). Furthermore, the first and second frame counts FC1, FC2 are measured and, thus, known as well. Thus, the ambient light level AL can be derived from the equations.

In the example introduced above the equations can be expressed as follows:

$FC1=AL+DL1=AL+DL\cdot(1\pm MI1/2)\cdot B$ $FC2=AL+DL2=AL+DL\cdot(1\mp MI2/2)\cdot B,$ wherein DL denotes a maximum brightness or defined brightness, DL1 and DL2 the first and second display level, MI1 and MI2 the first and second modulation index, and B denotes the mean display brightness (e.g. B=0.3 for 30% of maximum). If both sub-frames SFR1, SFR2 have the same modulation index MI1=MI2, the equations above can be further simplified:

$FC1=AL+DL\cdot(1-MI1/2)\cdot B$ $FC2=AL+DL\cdot(1+MI1/2)\cdot B.$

By subtraction of the first sub-frame SFR1 from the second sub-frame SFR2 and including the weighted duty cycle parameter and display levels, the maximum brightness or defined brightness can be extracted as:

$$DL = \frac{FC2-FC1}{MI1 \cdot B}.$$

Finally, the ambient light level AL can be deduced from any of the equations for FC1 or FC2 above as $AL=FC2-DL\cdot B.$ For example, the display generates DL=1000 counts. The ambient light generates AL=1700 counts. Let's assume the brightness is adjusted to B=0.3 and the modulation index is set to MI1=MI2=0.1. Then the integration of sub-frames gives the following count values FC1, FC2:

$FC1=AL+1000\cdot(1-0.1/2)\cdot 0.3=1985$ counts $FC2=AL+1000 \quad (1+0.1/2)\cdot 0.3=2015$ counts.

The display level DL can be expressed as:

$$DL = \frac{FC2-FC1}{MI1 \cdot B} = \frac{2015-1985}{0.1 \cdot 0.3} = 1000 \text{ counts.}$$

Furthermore, from the equations for FC1 or FC2 the numbers above determine the ambient light level and lead to AL=1700 counts.

Figure 5:
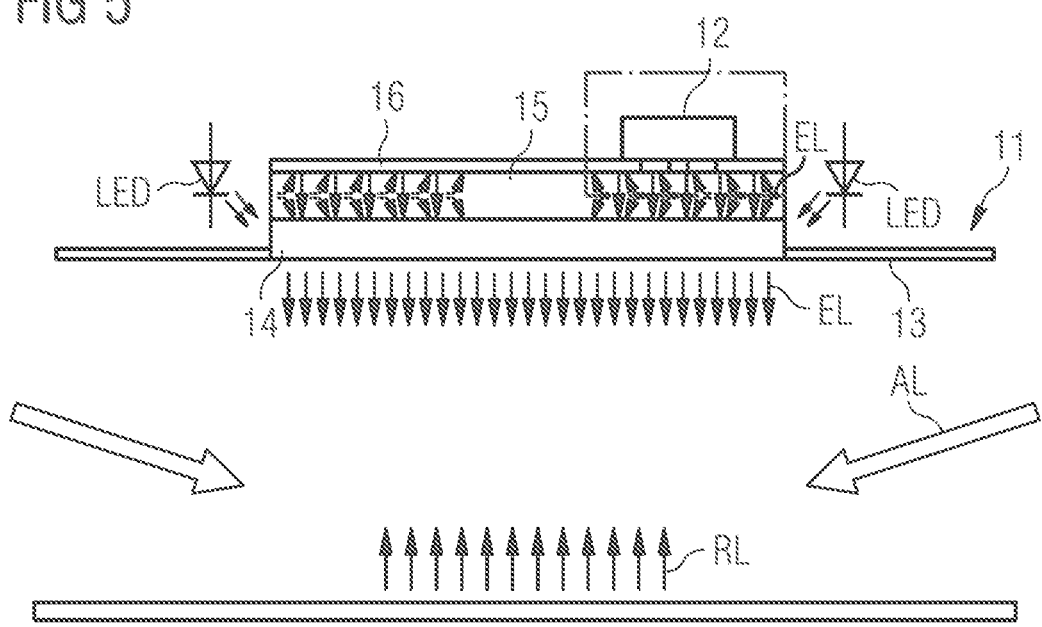
FIG. 5 shows an embodiment of a light sensor arrangement for light sensing.

FIG. 5 shows an embodiment of a light sensor arrangement for light sensing. The example embodiment shows an electronic device with a display and light sensor arrangement discussed above. The electronic device has a surface 13 and the display 11 is arranged on the surface. The display 11 comprises a panel of pixels 14, a backlight panel 15 and a reflector 16.

The light sensor arrangement 12 is arranged behind the display 11 (with respect to the main direction of emission).

During operation of the display several light sources may contribute to the sensor signal generated by the light sensor arrangement measured as frame counts. A fraction of the emitted light EL emitted by the display may be reflected back towards the light sensor arrangement as indicated by arrows in the drawing. The emitted light may partly stem from the pixels arranged in panel 14 and/or from LEDs used for backlighting the display. Furthermore, ambient light from different sources may strike the display 11 and traverse towards the light sensor arrangement 12 which gives rise to a contribution to the sensor signal.

The electronic device depicted in FIG. 5 illustrates one possible embodiment. Other types of displays and arrangements are possible without restricting the scope of the proposed concept. For example, active displays such as OLED displays may not have the backlight panel 15 but their respective pixels emit light without the need of an additional backlight.

Figure 6:
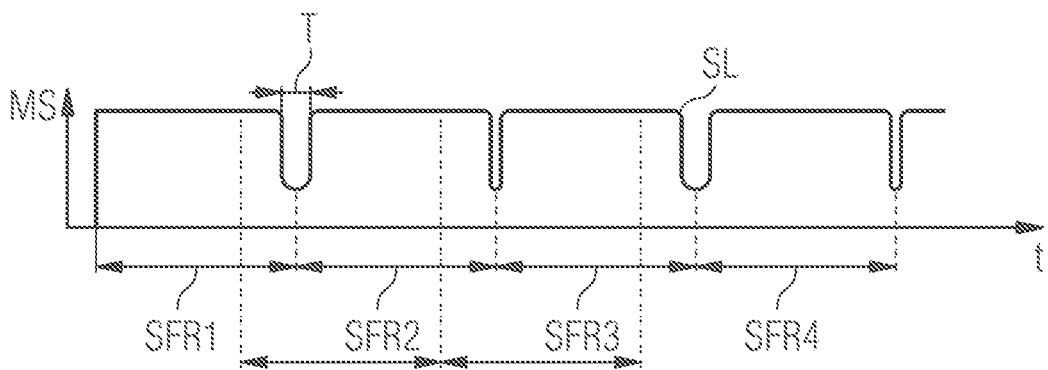
FIG. 6 shows an example integration scheme.

FIG. 6 an example integration scheme. In some applications it may suffice to employ integration times that are shorter than a complete duration of sub-frames. Four successive sub-frames SFR1 to SFR4 of a single frame FR are depicted. A transition from HIGH state to LOW state between two successive sub-frames may show a slope SL due to impact from neighboring pixels in the display. For example, the integration time may be centered at a transition between an on state and consecutive off state of the display, e.g. a corresponding transition between high and low levels in the modulation signal. Thus, shorter integration times may reveal the same information content, e.g. by scaling the respective frame counts integrated during the shorter integration times. The integration time can have the same length as a sub-frame or be shorter. Furthermore, it is possible to average over more than a single frame FR.

The invention claimed is:

1. A method for sensing light being incident on an electronic device, the electronic device comprising a display and a light sensor arrangement mounted behind the display such as to receive incident light through the display, the method comprising the steps of:
repeatedly switching the display on and off depending on a modulation signal, wherein a sub-frame is defined by an on-state and a consecutive off-state of the display, and the modulation signal depends on at least one modulation parameter, in a first sub-frame, setting a display brightness to a first level depending on a first value of the at least one modulation parameter, determining a first frame count by integrating the incident light by means of the light sensor arrangement during the first sub-frame, in a second sub-frame, setting the display brightness to a second level depending on a second value of the at least one modulation parameter, generating a second frame count by integrating the incident light by means of the light sensor arrangement during the second sub-frame, and determining an ambient light level depending on the first frame count and the second frame count, wherein for at least two sub-frames the first frame count, denoted FC1, and the second frame count denoted FC2, are expressed as follows:

$$FC1=AL+DL1=AL+DL(1.\pm.MI1/2)B$$

$$FC2=AL+DL2=AL+DL(1.\mp.MI2/2)B,$$

wherein DL denotes a maximum brightness or defined brightness, DL1 and DL2 the first and second display level, MI1 and MI2 denote first and second modulation indices, and B denotes a mean display brightness.

2. The method according to claim 1, wherein a first integration time corresponds to a duration of the first sub-frame such that the first frame count is indicative of the incident light integrated during the first integration time, and a second integration time corresponds to a duration of the second sub-frame such that the second frame count is indicative of the incident light integrated during the second integration time.

3. The method according to claim 2, wherein the first integration time corresponds to a fraction of the duration of the first sub-frame, and/or the second integration time corresponds to a fraction of the duration of the second sub-frame.

4. The method according to claim 2, wherein the first and the second integration times are the same in value.

5. The method according to claim 1, wherein the modulation signal comprises a succession of pulses with consecutive high and low levels, and the sub-frames are synchronized to the pulses of the modulation signal and/or the synchronization signal.

6. The method according to claim 5, wherein the modulation signal is a pulse width modulation signal.

7. The method according to claim 6, wherein the pulses of the modulation signal are modulated each have a duty cycle and each duty cycle is set by means of a duty cycle parameter as modulation parameter.

8. The method according to claim 5, wherein the pulses of the modulation signal each have an amplitude, and the amplitudes are set by means of an amplitude parameter as modulation parameter.

9. The method according to claim 8, wherein a supply current of the display and/or pixels of the display is set by means of the amplitude parameter.

10. The method according to claim 1, wherein the pulses of the modulation signal are modulated by means of a timing parameter as modulation parameter, wherein a duration of sub-frames are altered as a function of the modulation parameter, or wherein the light sensor arrangement comprises a light sensor and the ambient light level is used to adjust the display brightness.

11. The method according to claim 1, wherein the light sensor arrangement comprises a color light sensor and the ambient light level is used to adjust a display color, such as, a color temperature value of the display.

12. The method according to claim 1, wherein two consecutive sub-frames are used as first and second sub-frames to determine the ambient light level, or a number of first sub-frames and a number of second sub-frames are used to determine the ambient light level, wherein the sub-frames are from the same frame or from different frames.

13. The method according to claim 1, wherein the display brightness at the first and/or second level is set for a region of interest and the light sensor arrangement integrates incident light locally from the region of interest, or the display brightness at the first and/or second level is set for the whole display and the light sensor arrangement integrates incident light globally for the whole display.

14. The method according to claim 1, wherein the display brightness BR over one frame rate has a same level, wherein Ton represents a mean active pulse time of the sub-frames during a frame with frame rate FR such that BR=Ton/FR.

15. The method according to claim 14, wherein over one frame rate FR the display brightness BR has the same level, wherein the modulation signal is modulated such that off times for said frame cancel out.

16. The method according to claim 14, wherein over one frame rate FR the display brightness BR has the same level, wherein the modulation signal is modulated such that the amplitudes are set around a mean amplitude.

17. The method according to claim 1, wherein the at least two sub-frames have same modulation indexes such that MI1=MI2, such that the display level is determined as:

$$DL = \frac{FC2 - FC1}{MI1 \cdot B}$$

and the ambient light level AL is determined as:
AL=FC2−DLB.

18. A method for sensing light being incident on an electronic device, the electronic device comprising a display and a light sensor arrangement mounted behind the display such as to receive incident light through the display, the method comprising the steps of: repeatedly switching the display on and off depending on a modulation signal, wherein a sub-frame is defined by an on-state and a consecutive off-state of the display, and the modulation signal depends on at least one modulation parameter, in a first sub-frame, setting a display brightness to a first level depending on a first value of the at least one modulation parameter, determining a first frame count by integrating the incident light by means of the light sensor arrangement during the first sub-frame, in a second sub-frame, setting the display brightness to a second level depending on a second value of the at least one modulation parameter, generating a second frame count by integrating the incident light by means of the light sensor arrangement during the second sub-frame, and determining an ambient light level depending on the first frame count and the second frame count, wherein a synchronization signal is provided and comprises synchronizing pulses, wherein two consecutive synchronizing pulses define a frame of the display, a frame comprises at least the first sub-frame and the second sub-frame, and a succession of sub-frames is synchronized with the synchronization signal.

* * * * *

UNITED STATES PATENT AND TRADEMARK OFFICE
CERTIFICATE OF CORRECTION

PATENT NO. : 11,114,025 B2
APPLICATION NO. : 16/964792
DATED : September 7, 2021
INVENTOR(S) : Greimel-Langauer et al.

Page 1 of 1

It is certified that error appears in the above-identified patent and that said Letters Patent is hereby corrected as shown below:

In the Claims

At Column 11, Line 30, in Claim 1, please amend equations as:
$FC1=AL+DL1=AL+DL\cdot(1\pm MI1/2)\cdot B$ At Column 11, Line 32, in Claim 1, please amend equations as:
$FC2=AL+DL2=AL+DL\cdot(1\mp MI2/2)\cdot B$ Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*